Figure 1:
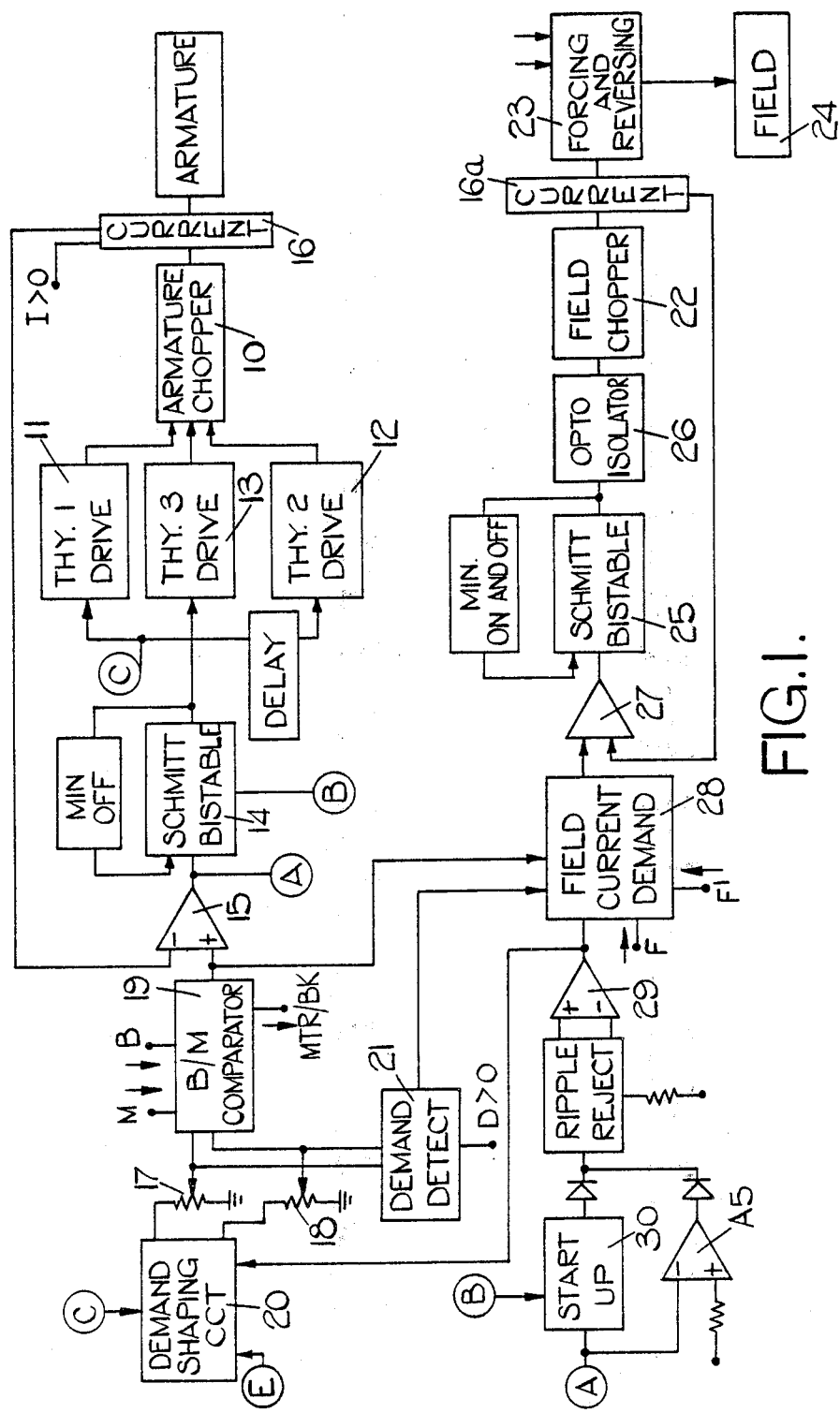

United States Patent [19]

Owen

[11] 4,410,842
[45] Oct. 18, 1983

[54] BATTERY-POWERED ELECTRIC VEHICLE D.C. MOTOR CONTROL

[75] Inventor: Richard A. Owen, Warley, England

[73] Assignee: Lucas Industries Limited, Birmingham, England

[21] Appl. No.: 304,386

[22] Filed: Sep. 22, 1981

[30] Foreign Application Priority Data

Oct. 2, 1980 [GB] United Kingdom ............... 8031860

[51] Int. Cl.³ ........................................... B60K 41/00
[52] U.S. Cl. .................................. 318/139; 318/362; 318/370
[58] Field of Search ..................... 318/139, 757–761, 318/362–363, 370, 375

[56] References Cited

U.S. PATENT DOCUMENTS 4,351,405 9/1982 Fields et al. ...................... 318/139

*Primary Examiner*—B. Dobeck
*Assistant Examiner*—A. Evans

*Attorney, Agent, or Firm*—Ferguson, Baker, Whitham, Spooner, and Kroboth

[57] ABSTRACT

A battery powered electric vehicle d.c. motor control includes a first potentiometer actuable by an accelerator pedal and a second potentiometer actuable by a brake pedal. The motor current is controlled in accordance with the signals at the sliders of these potentiometers and contactors determine the connection mode of the motor under the control of a comparator which is sensitive to the signal at the slider of the first potentiometer only. This causes braking mode to be selected except when the accelerator pedal is depressed. A resistor is connected in series with the second potentiometer to ensure that a minimum braking demand signal is always present, but means is provided for cancelling this minimum braking demand signal in certain vehicle operating conditions and further means is connected to the comparator for overridingly selecting motoring mode in these conditions.

4 Claims, 4 Drawing Figures

FIG.I.

16 1

BATTERY-POWERED ELECTRIC VEHICLE D.C. MOTOR CONTROL

This invention relates to a battery-powered electric vehicle d.c. motor control.

It has already been proposed to determine whether the connection configuration of an electric vehicle d.c. motor is switched to provide motoring or braking in accordance with signals present on accelerator and braking demand potentiometers actuated by accelerator and brake pedals respectively. For example, in P.C.T. Application No. PCT/GB78/00046 there is disclosed a control circuit in which selection of the connection configuration is made by comparing the demand signals at the sliders of the two potentiometers.

The driving of a vehicle fitted with a circuit of this kind, however, does not correspond very closely to the driving of a petrol engined vehicle—in which substantial engine braking is obtained merely by releasing of the accelerator pedal, engine braking being independent of mechanical braking.

It is thus one object of the present invention to provide a battery-powered electric vehicle d.c. motor control in which braking can be initiated merely by releasing the accelerator pedal.

In accordance with the invention there is provided a battery-powered electric vehicle d.c. motor control comprising a first potentiometer actuable by an accelerator pedal, a second potentiometer actuable by a brake pedal, motor current control means connected to control the current flow in the motor in accordance with a demand signal determined by the signals at the sliders of said potentiometers, contactor means for varying the connection configuration of the motor to provide motoring or regenerative braking operation, contactor control means sensitive to the signal at the slider of the first potentiometer only so as to switch the contactors to provide braking mode except when the accelerator pedal is depressed out of its rest position, means for generating a minimum demand signal when both pedals are in their rest positions and means for overridingly causing the contactor control means to switch the contactors to motoring mode, and for cancelling said minimum demand signal in certain vehicle operating conditions.

Preferably, said means for generating a minimum demand signal comprises a resistor in series with the second potentiometer. The minimum demand signal can then be cancelled by means of a switch device connected across the series combination of the second potentiometer and said resistor.

Figure 2:
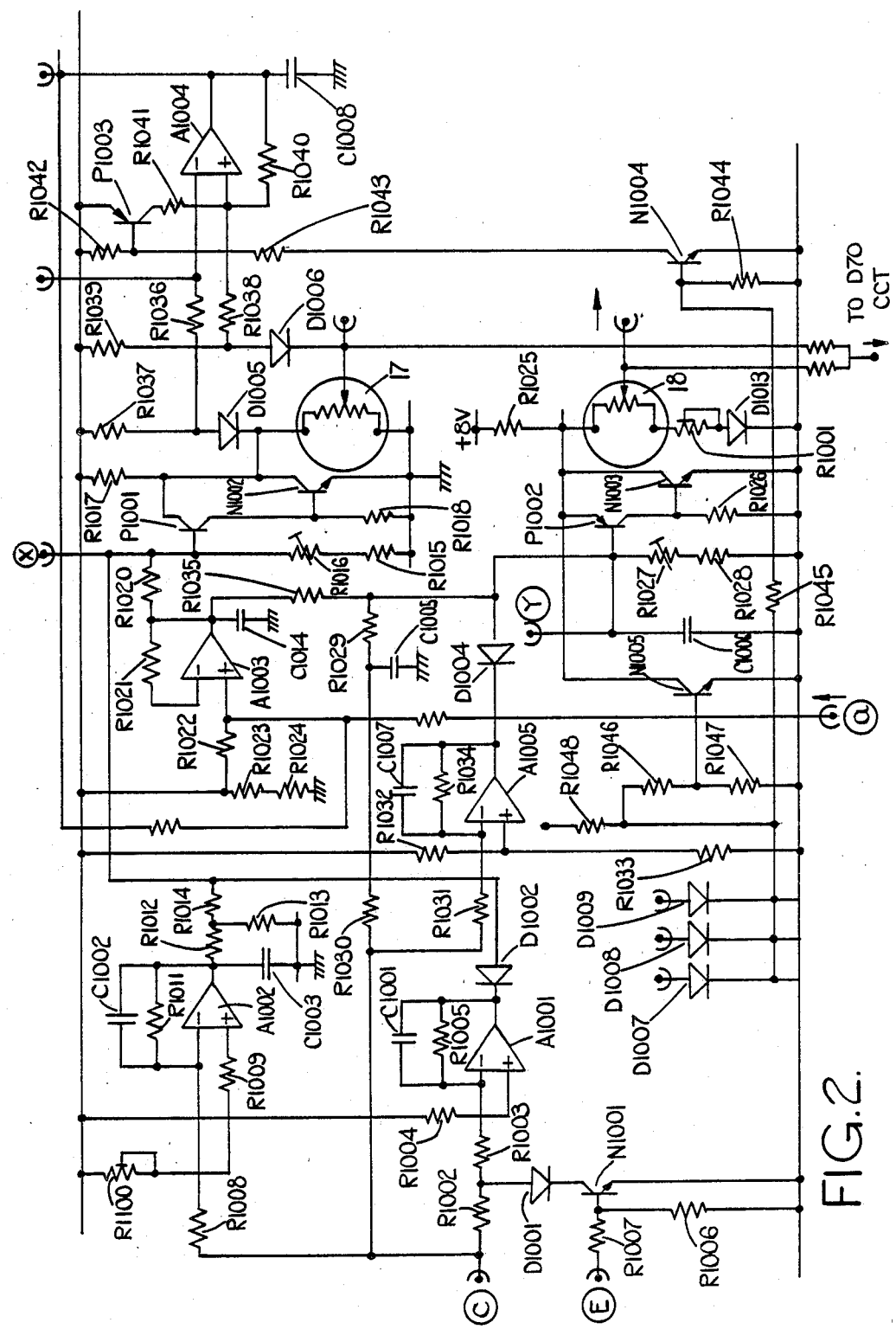
Figure 3:
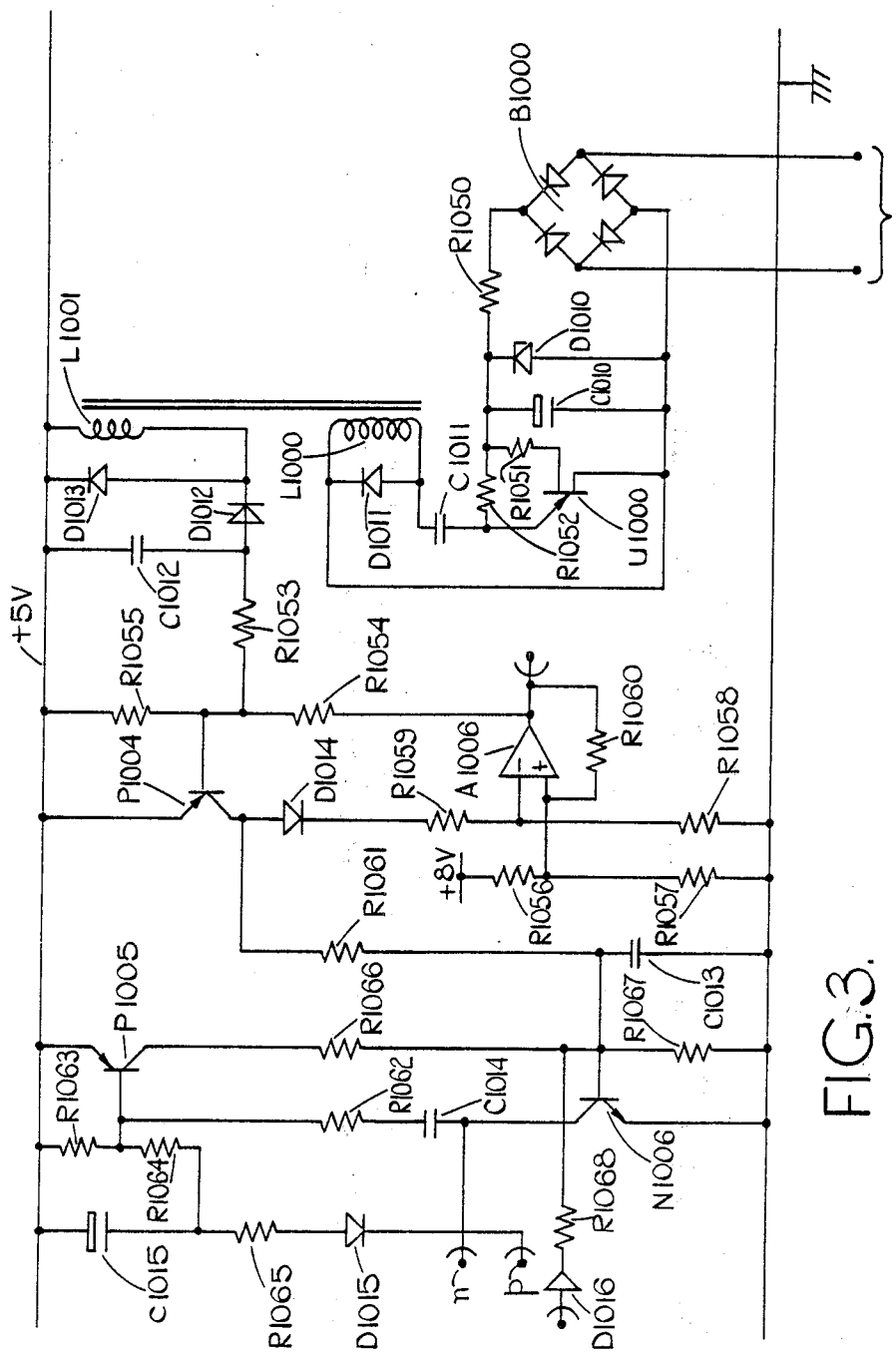
Figure 4:
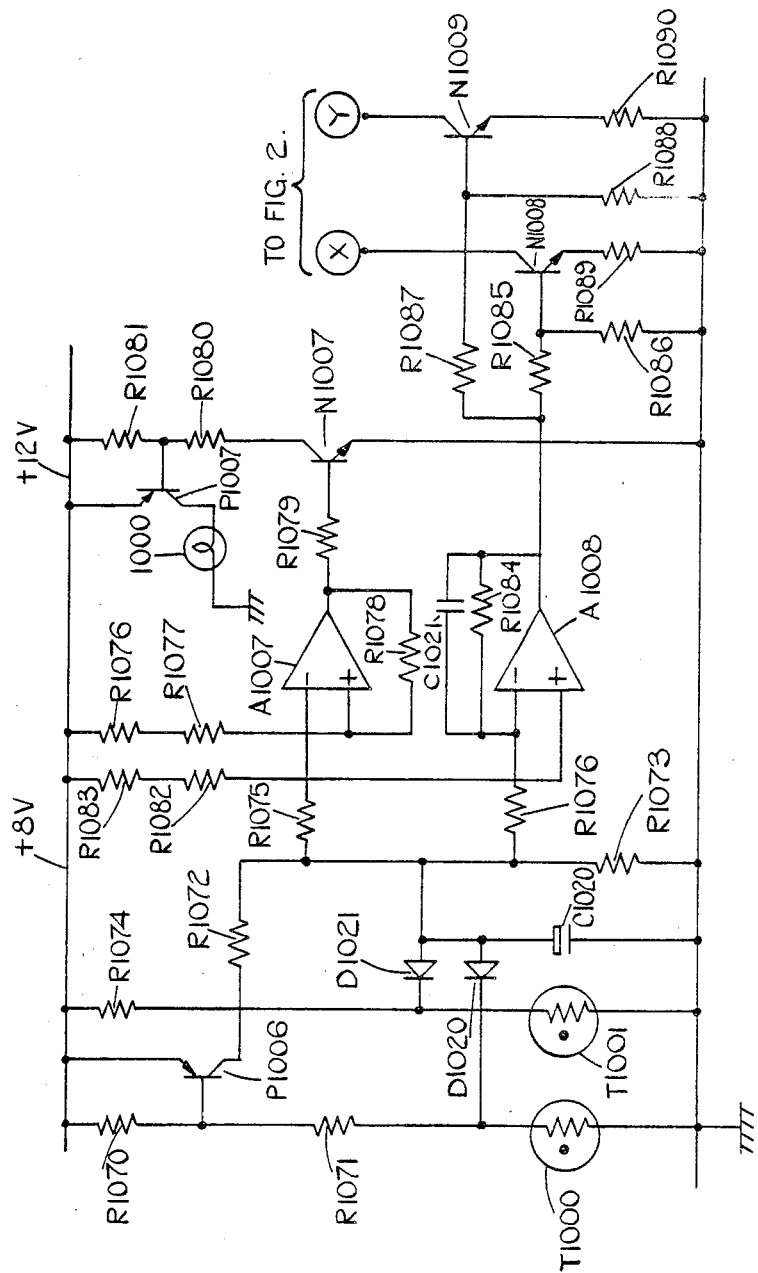

An example of the present invention is illustrated in the accompanying drawings in which:

FIG. 1 is a block diagram identical to FIG. 1 of the drawings of the aforementioned application No. PCT/GB78/00046, FIG. 2 is a circuit diagram showing a demand shaping circuit and a motor/brake comparator circuit used in FIG. 1, FIG. 3 shows a modification of the part of the circuit shown in FIG. 7c of application No. PCT/GB78/00046 and, FIG. 4 is a circuit diagram of an additional temperature sensitive circuit included in the system.

The block diagram of FIG. 1 is fully described in application No. PCT/GB78/00046 and will not be redescribed herein. In fact, although not shown in FIG. 1, two changes are made in the present case. Firstly, an added resistor 1001 is included in series with the brake potentiometer 18, and secondly, the motor brake comparator 19 does not have connections from the sliders of potentiometers 17 and 18 but has its inputs from the +ve end of potentiometer 17 and the slider of the same potentiometer.

These changes are shown in FIG. 2 which also show the demand speed shaping circuit 20 and the motor/brake comparator circuit 19.

The demand speed-shaping circuit includes a first input terminal C which receives its input from the collector of transistor P3 shown in FIG. 3 of application No. PCT/GB78/00046. This terminal is high whenever the main SCR of the chopper circuit is on. Terminal C is connected by two resistors $R_{1002}$ and $R_{1003}$ in series to the inverting input of an operational amplifier $A_{1001}$, the non-inverting input of which is connected to the +8V positive supply rail by a resistor $R_{1004}$. Connected between the inverting input of amplifier $A_{1001}$ and its output terminal are a resistor $R_{1005}$ and a capacitor $C_{1001}$ in parallel.

The junction of the resistor $R_{1002}$, $R_{1003}$ is connected to the anode of a diode $D_{1001}$, the cathode of which is connected to the collector of an npn transistor $N_{1001}$ which has its emitter connected to the ground rail. A resistor $R_{1006}$ connects the base of transistor $N_{1001}$ to the ground rail and another resistor $R_{1007}$ connects the base of that transistor to an input terminal E, which is connected to the forward/reverse selector switch (see FIG. 7a of application No. PCT/GB78/00046) so that terminal E is high whenever forward drive is selected.

The terminal C is also connected by a resistor $R_{1008}$ to the inverting input of an operational amplifier $A_{1002}$, the non-inverting input of which is connected by a resistor $R_{1009}$ and a variable resistor $R_{1100}$ in series to the +8V rail. The output of amplifier $A_{1002}$ is connected by a resistor $R_{1011}$ in parallel with a capacitor $C_{1002}$ to the inverting input thereof and is also connected by a capacitor $C_{1003}$ to the ground rail. Two resistors $R_{1012}$ and $R_{1013}$ in series are connected across the capacitor $C_{1003}$ and a resistor $R_{1014}$ connects the junction of these resistors to the base of a pnp transistor $P_{1001}$. A diode $D_{1002}$ has its cathode connected to output of amplifier $A_{1001}$ and its anode connected to the base of transistor $P_{1001}$.

Transistor $P_{1001}$ has its base connected to the ground rail by a resistor $R_{1015}$ and a variable resistor $R_{1016}$ in series. The emitter of transistor $P_{1001}$ is connected by a resistor $R_{1017}$ to the +8v rail and its collector is connected by a resistor $R_{1018}$ to the ground rail. An npn transistor $N_{1002}$ has its base connected to the collector of the transistor $P_{1001}$ and its emitter connected to the ground rail. The collector of the transistor $N_{1002}$ is connected to the emitter of the transistor $P_{1001}$. Transistors $P_{1001}$ and $N_{1002}$ operate as a very high input impedance compound emitter follower, with the emitter of transistor $P_{1001}$ at a voltage one diode voltage drop above that at the base thereof. The accelerator pedal potentiometer 17 is connected across the collector emitter of the transistor $N_{1002}$.

A further operational amplifier $A_{1003}$ has its output terminal connected by a resistor $R_{1020}$ to the base of the transistor $P_{1001}$. This amplifier $A_{1003}$ is connected as a voltage follower with its inverting input connected by a resistor $R_{1021}$ to its output terminal and its non-inverting input connected by a resistor $R_{1022}$ to the slider of a potentiometer $R_{1023}$ which is connected at one end to the positive supply rail and its other end connected by a resistor $R_{1024}$ to ground. Resistors $R_{1022}$, $R_{1023}$ and $R_{1024}$ provide input bias current to amplifier $A_{1003}$ to set its output at a predetermined value. The output of amplifier $A_{1003}$ can be changed from this value in two ways viz by a signal from an operational amplifier $A_{1004}$ (yet to be described in detail) the output of which is high when "motoring" mode is selected (as will be explained hereinafter) and by a signal from the field weakening amplifier (29 in FIG. 1). A capacitor $C_{1004}$ connects to the output of amplifier to ground.

The brake pedal potentiometer 18 is connected at one end by the variable resistor $R_{1001}$ to the anode of a diode $D_{1003}$, the cathode of which is connected to ground, and at the other end by a resistor $R_{1025}$ to the supply rail. The collector of an npn transistor $N_{1003}$ is connected to said other end of the potentiometer 18 and its emitter is connected to ground. The base of transistor $N_{1003}$ is connected to the collector of a pnp transistor $P_{1002}$ and by a resistor $R_{1026}$ to ground. The emitter of transistor $P_{1002}$ is connected to the collector of transistor $N_{1003}$. The base of transistor $P_{1002}$ is connected by a variable resistor $R_{1027}$ and a resistor $R_{1028}$ in series to ground and by a pair of resistors $R_{1029}$ and $R_{1030}$ in series to the input terminal C. A capacitor $C_{1005}$ connects the junction of the resistors $R_{1029}$ and $R_{1030}$ to ground. A further capacitor $C_{1006}$ connects the base of the transistor $P_{1002}$ to ground.

An operational amplifier $A_{1005}$ has its inverting input connected by a resistor $R_{1031}$ to the input terminal C. The non-inverting input of this amplifier $A_{1005}$ is connected to the junction of two resistors $R_{1032}$, $R_{1033}$ which are connected in series between the supply rail and ground. A resistor $R_{1034}$ and a capacitor $C_{1007}$ in parallel connect the output terminal of amplifier $A_{1005}$ to its inverting input terminal. A diode $D_{1004}$ has its cathode connected to the output of amplifier $A_{1005}$ and its anode connected to the base of the transistor $P_{1002}$.

A resistor $R_{1035}$ connects the output of the amplifier $A_{1003}$ to the base of the transistor $P_{1002}$.

The motor/brake comparator 19 of FIG. 1 is constituted by the amplifier $A_{1004}$ already mentioned above. The inverting input of this amplifier $A_{1004}$ is connected by a resistor $R_{1036}$ to the anode of a diode $D_{1005}$, the cathode of which is connected to collector of the transistor $N_{1002}$. The anode of diode $D_{1005}$ is also connected by a resistor $R_{1037}$ to the supply rail. The non-inverting input of amplifier $A_{1004}$ is connected by a resistor $R_{1038}$ to the anode of a diode $D_{1006}$, the cathode of which is connected to the slider of the accelerator pedal potentiometer 17. The anode of diode $D_{1006}$ is also connected by a resistor $R_{1039}$ to the supply rail. A feedback resistor $R_{1040}$ is connected between the output terminal of amplifier $A_{1004}$ and its non-inverting input and a capacitor $C_{1008}$ is connected between the output terminal of amplifier $A_{1004}$ and ground.

The resistors $R_{1036}$ to $R_{1039}$ are chosen so that the output of amplifier $A_{1004}$ is high except when the slider of potentiometer 17 is in the bottom 5% of its travel, i.e. when the accelerator pedal is in its released position or only slightly depressed from that position.

For overriding the motor/brake comparator in certain conditions there is a pnp transistor $P_{1003}$ which has its emitter connected to the supply rail and its collector connected by a resistor $R_{1041}$ to the non-inverting input of amplifier $A_{1004}$. When transistor $P_{1003}$ is conductive the output of amplifier $A_{1004}$ is high whatever the position of the accelerator pedal. The base of transistor $P_{1003}$ is connected by a resistor $R_{1042}$ to the supply rail and by a resistor $R_{1043}$ to the collector of an npn transistor $N_{1004}$. The emitter of the transistor $N_{1004}$ is connected to ground and a resistor $R_{1044}$ connects the base of this transistor to ground. The base of transistor $N_{1004}$ is also connected by a resistor $R_{1045}$ to the cathodes of three diodes $D_{1007}$, $D_{1008}$ and $D_{1009}$, the anodes of which are connected to inputs from other parts of the control circuit. The cathodes of the diodes $D_{1007}$, $D_{1008}$ and $D_{1009}$ are also connected by two resistors $R_{1046}$ and $R_{1047}$ in series to the ground rail and the junction of these resistors is connected to the base of an npn transistor $N_{1005}$. A resistor $R_{1048}$ connects the cathodes of diodes $D_{1007}$, $D_{1008}$ and $D_{1009}$ to a terminal which is connected to a driver operable switch through which this terminal can be connected to the $+8v$ supply rail, when it is required to inhibit regenerative braking. The emitter of transistor $N_{1005}$ is grounded and its collector is connected to the collector of the transistor $N_{1003}$. Whenever the signal at the anode of any one of the diodes $D_{1007}$, $D_{1008}$ or $D_{1009}$ is high the transistors $N_{1005}$, $N_{1004}$ and $P_{1003}$ turn on thereby shorting out the demand signal from the brake potentiometer 18 and forcing the output of amplifier $A_{1004}$ high.

Turning now to FIG. 3 a bridge rectifier $B_{1000}$ has its inputs connected to opposite ends of the motor armature winding. The negative output of the bridge rectifier is connected to one end of a transformer primary winding $L_{1000}$. The positive output of the bridge rectifier is connected by a resistor $R_{1050}$ to the cathode of a zener diode $D_{1010}$, the anode of this zener diode being connected to the negative output of the bridge rectifier. A capacitor $C_{1010}$ is connected across the zener diode $D_{1010}$. A unijunction transistor $U_{1000}$ has its $B_1$ terminal connected to the negative output of the bridge rectifiers $B_{1000}$, its $B_2$ terminal connected by a resistor $R_{1051}$ to the cathode of zener diode $D_{1010}$ and its emitter terminal connected by a resistor $R_{1052}$ to the cathode of zener diode $D_{1010}$. A capacitor $C_{1011}$ couples the emitter of u.j.t. $U_{1000}$ to the other end of the winding $L_{1000}$ and a diode $D_{1011}$ is connected across the winding $L_{1000}$.

The secondary winding $L_{1001}$ of the transformer is connected at one end to a $+5v$ supply rail and at the other end to the cathode of a diode $D_{1012}$ and the anode of a diode $D_{1013}$, the cathode of which is connected to the $+5v$ supply rail. A capacitor $C_{1012}$ connects the anode of the diode $D_{1012}$ to the $+5v$ supply rail and becomes charged up whenever there is a voltage across the armature (generated by movement of the electric vehicle) sufficient to cause u.j.t. $U_{1000}$ to oscillate.

A resistor $R_{1053}$ connects the anode of the diode $D_{1012}$ to the base of a pnp transistor $P_{1004}$, the emitter of which is connected to the $+5v$ supply rail. The base of the transistor $P_{1004}$ is also connected to the junction of two resistors $R_{1054}$ and $R_{1055}$ connected in series between the output of an operational amplifier $A_{1006}$ and the $+5v$ supply rail. The amplifier $A_{1006}$ has its non-inverting input connected to the junction of two resistors $R_{1056}$ and $R_{1057}$ connected in series between the $+8v$ supply rail and ground and its inverting input connected to the junction of two further resistors $R_{1058}$ and $R_{1059}$ connected in series between ground and the cathode of a diode $D_{1014}$, the anode of which is connected to the collector of the transistor $P_{1004}$. A resistor $R_{1060}$ is connected between the output of amplifier $A_{1006}$ and its non-inverting amplifier so as to provide rapid switching thereof in the manner of a Schmitt trigger circuit. The output of amplifier $A_{1006}$ is connected to the anode of the diode $D_{1007}$ (FIG. 2).

The collector of the transistor $P_{1004}$ is connected by a resistor $R_{1061}$ to the base of an npn transistor $N_{1006}$, which base is also connected by a capacitor $C_{1013}$ to ground. The emitter of transistor $N_{1006}$ is connected to ground and its collector is connected to a terminal n (which is the same as terminal n in FIG. 7c of application No. PCT/GB78/00046). The collector of transistor $N_{1006}$ is also connected by a capacitor $C_{1014}$ and a resistor $R_{1062}$ in series to the base of a pnp transistor $P_{1005}$, the emitter of which is connected to the +5v rail. The base of transistor $P_{1005}$ is also connected to the junction of two resistors $R_{1063}$, $R_{1064}$ connected in series across a capacitor $C_{1015}$ connected at one side to the +5v rail and at the other side by a resistor $R_{1065}$ and diode $D_{1015}$ in series to a terminal p (which is the same as terminal p in FIG. 7c of application No. PCT/GB78/00046). The collector of transistor $P_{1005}$ is connected by two resistors $R_{1066}$ and $R_{1067}$ in series to ground and the junction of these resistors is connected to the base of the transistor $N_{1006}$. A diode $D_{1016}$ and a resistor $R_{1068}$ having no equivalent in FIG. 7c of application No. PCT/GB78/00046 connect the base of transistor $N_{1006}$ to the collector of the transistor $N_{33}$ which is shown in FIG. 7b of application No. PCT/GB78/00046.

Turning finally to FIG. 4, the temperature sensitive circuit shown therein, includes two thermistors $T_{1000}$, $T_{1001}$ are arranged to be sensitive respectively to the temperatures of the motor itself and of a heat sink of the thyristor chopper circuit 10. Thermistor $T_{1000}$ is connected at one side to ground and at the other side by two resistors $R_{1070}$ and $R_{1071}$ in series to the +8v supply rail. A pnp transistor $P_{1006}$ has its base connected to the junction of these two resistors and its emitter connected to the +8v rail. The collector of the transistor $P_{1006}$ is connected by two resistors $R_{1072}$ and $R_{1073}$ in series to ground. The junction of resistors $R_{1072}$ and $R_{1073}$ is connected to the anode of a diode $D_{1020}$, the cathode of which is connected to said other side of the thermistor $T_{1000}$. A capacitor $C_{1020}$ is connected across the resistor $R_{1073}$. The thermistor $T_{1001}$ is connected in series with a resistor $R_{1074}$ between the +8v rail and ground and a diode $D_{1021}$ has its cathode connected to the junction of the resistor $R_{1074}$ and the thermistor $T_{1001}$, and its anode to the anode of diode $D_{1020}$.

The junction of resistors $R_{1072}$ and $R_{1073}$ is connected by a resistor $R_{1075}$ to the inverting input of an operational amplifier $A_{1007}$ and by a resistor $R_{1076}$ to the inverting input of an operational amplifier $A_{1008}$. The non-inverting input of amplifier $A_{1007}$ is connected to the +8v rail by the two resistors $R_{1077}$ and $R_{1078}$ is series selected so that the output of amplifier goes high if the temperature of either thermistor rises above 70° C. A positive feedback resistor $R_{1078}$ is connected between the output and non-inverting input of amplifier $A_{1007}$ and is of relatively high ohmic value so as to introduce a small amount of hysteresis into the switching action of the amplifier $A_{1007}$ and to prevent the amplifier $A_{1007}$ "dithering" between its two switch states when the temperature is at an almost steady value around 70° C.

The output of amplifier $A_{1007}$ is connected by a resistor $R_{1079}$ to the base of a npn transistor $N_{1007}$. The emitter of this transistor $N_{1007}$ is grounded and its collector is connected by two resistors $R_{1080}$ and $R_{1081}$ in series to a +12v rail. A pnp transistor $P_{1007}$ has its emitter connected to the +12v rail its base connected to the junction of resistors $R_{1080}$, $R_{1081}$ and its collector connected via a warning lamp 1000 to ground. The lamp turns on whenever the output of amplifier $A_{1007}$ goes high.

The amplifier $A_{1008}$ has its non-inverting input connected by a pair of resistors $R_{1082}$, $R_{1083}$ in series to the +8v rail, and its output terminal connected by a resistor $R_{1084}$ and a capacitor $C_{1021}$ in parallel to its inverting input terminal. The output terminal of amplifier $A_{1008}$ is connected by two resistors $R_{1085}$ and $R_{1086}$ in series to ground and also by two resistors $R_{1087}$ and $R_{1088}$ in series to ground. A npn transistor $N_{1008}$ has its base connected to the junction of resistor $R_{1085}$ and $R_{1086}$ and its emitter connected by a resistor $R_{1089}$ to ground. The collector of transistor $R_{1008}$ is connected to the base of transistor $P_{1001}$ (FIG. 2). Similarly an npn transistor $N_{1009}$ has its base connected to the junction of resistors $R_{1087}$ and $R_{1088}$, its emitter connected by a resistor $R_{1090}$ to ground and its collector connected to the base of transistor $P_{1002}$ (FIG. 2).

The circuit described operates as follows: the d.c. signals on the upper ends of the accelerator and brake potentiometer 17 and 18 vary in accordance with the speed of the vehicle which is measured as a function of the mark-to-space ratio of the output of the Schmitt trigger circuit 14 (FIG. 1). In the case of the accelerator pedal potentiometer 17, the signal is boosted at low speed by the positive d.c. output of amplifier $A_{1002}$ when the mark-to-space ratio is small, because of the relatively small positive average d.c. input to amplifier $A_{1002}$. As the mark-to-space ratio increases to a point where the average d.c. input is larger than the bias input via the resistor $R_{1100}$, the output of amplifier becomes increasingly negative so that the "extra" current provided by amplifier $A_{1002}$ to the resistors $R_{1016}$, $R_{1015}$ which bias transistor $P_{1001}$ is gradually reduced to zero. The signal then remains constant with increasing speed until the field weakening effect commences at which speed the signal at terminal a starts to fall and the output of amplifier $A_{1003}$ falls linearly, thereby lowering the base voltage of transistor $P_{1001}$ and consequently causing the signal at the upper end of potentiometer 17 to fall with increasing speed. The amplifier $A_{1001}$ has an effect on the signal only when reverse drive is selected which causes the signal at terminal E to go low and turns off transistor $N_{1001}$ which is normally on and holds the output of amplifier $A_{1001}$ high, diode $D_{1002}$ blocking this high output. When transistor $N_{1001}$ turns off and the mark-to-space ratio of the signal at terminal C is high enough to cause the output of amplifier $A_{1001}$ to start falling from its maximum value, diode $D_{1002}$ pulls down the voltage on the base of transistor $P_{1001}$ and reduces the maximum demand signal.

In the braking mode the signal at terminal C is inverted i.e. at low speeds the average voltage at terminal C is high. Thus the output of amplifier $A_{1005}$ is low pulling the base of transistor $P_{1002}$ low. As speed increases the voltage at terminal C decreases so that the output of amplifier $A_{1005}$ increases until diode $D_{1004}$ becomes reverse biased. The voltage at the base of transistor $P_{1002}$ reaches a maximum value at this speed and then starts to fall until the voltage at terminal C is zero due to the falling voltage on capacitor $C_{1005}$ (after which control of the motor is effected by field control) and as speed increases the output of amplifier $A_{1003}$ starts to fall. In braking operation the output of amplifier $A_{1004}$ is low (as will be explained) so that the "normal" maximum demand signal set by amplifier $A_{1003}$ is lower than in motoring.

The state of amplifier $A_{1004}$ is determined mainly by the position of the accelerator pedal. Thus when the pedal is in the first 5% of its travel braking is selected, whatever the position of the brake pedal. Depression of the accelerator pedal by more than 5% of its travel causes the output of amplifier $A_{1004}$ to go high, so that motoring is selected. If, however, the signals at the anodes of any of the diodes $D_{1007}$, $D_{1008}$ or $D_{1009}$ goes high, the transistors $N_{1004}$ and $P_{1003}$ turn on, thereby forcing the output of amplifier $A_{1004}$ high whatever the position of the accelerator pedal. At the same time transistor $N_{1005}$ turns on and shorts out the signal on the upper end of the brake pedal potentiometer 18 so that no demand signal is produced, as a result of the added resistor $R_{1001}$, which sets the minimum brake current demand. This occurs when the amplifier $A_{1006}$ (FIG. 3) output is high (indicating that the vehicle is stationary), during power up and when reverse has been selected.

Finally the circuit of FIG. 4 operates to illuminate the lamp 1000 if either the motor on the chopper circuit starts of become excessively hot. At a higher temperature both the maximum motoring demand and the maximum braking demand start to be reduced with increasing temperature until finally at a still higher temperature the maximum motor demand is reduced to zero. The maximum braking demand falls more slowly with rising temperature by appropriate choice of resistors $R_{1090}$) so that when the output of amplifier $A_{1008}$ is at its maximum value, the maximum brake demand is still not zero. Transistor $P_{1006}$ is normally on at all temperatures, but if thermistor $T_{1000}$ is open circuit transistor $P_{1006}$ turns off so that the inverting input of amplifier $A_{1008}$ goes low, so that its output is high, thereby setting the motoring and braking demands to zero or a low value.

I claim:

1. A battery-powered electric vehicle d.c. motor control comprising a first potentiometer actuable by an accelerator pedal, a second potentiometer actuable by a brake pedal, motor current control means connected to control the current flow in the motor in accordance with a demand signal determined by the signals at the sliders of said potentiometers, contactor means for varying the connection configuration of the motor to provide motoring mode operation or regenerative braking mode operation, contactor control means sensitive to the signal at the slider of the first potentiometer only so as to switch the contactors to provide braking mode operation except when the accelerator pedal is depressed out of its rest position, means for generating a non-zero minimum demand signal when both pedals are in their rest positions and means for overridingly causing the contactor control means to switch the contactors to said motoring mode operation, and for cancelling said minimum demand signal in certain vehicle operating conditions.

2. A control as claimed in claim 1 in which said means for generating a minimum demand signal comprises a resistor in series with said second potentiometer.

3. A control as claimed in claim 2 in which said means for cancelling said minimum demand signal comprises a switch device connected across the series combination of the second potentiometer and said resistor.

4. A control as claimed in claim 3 in which said switch device is a semiconductor device which is rendered conductive when any said certain vehicle operating conditions occurs.

* * * * *